United States Patent
Tamura (10) Patent No.: US 10,209,934 B2
(45) Date of Patent: Feb. 19, 2019

(54) INFORMATION PROCESSING APPARATUS, INFORMATION PROCESSING SYSTEM, AND USAGE MANAGEMENT METHOD

(71) Applicant: Shingo Tamura, Kanagawa (JP)

(72) Inventor: Shingo Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/702,963

(22) Filed: Sep. 13, 2017

(65) Prior Publication Data

US 2018/0081608 A1 Mar. 22, 2018

(30) Foreign Application Priority Data

Sep. 16, 2016 (JP) .................................. 2016-182406

(51) Int. Cl.
*G06F 3/12* (2006.01)
*H04N 1/00* (2006.01)
*H04N 1/32* (2006.01)

(52) U.S. Cl.
CPC .......... *G06F 3/1239* (2013.01); *G06F 3/1218* (2013.01); *G06F 3/1285* (2013.01); *H04N 1/00244* (2013.01); *H04N 1/00344* (2013.01); *H04N 1/00915* (2013.01); *H04N 1/32539* (2013.01); *H04N 2201/0094* (2013.01)

(58) Field of Classification Search
CPC combination set(s) only.
See application file for complete search history.

(56) References Cited

U.S. PATENT DOCUMENTS

| 2009/0316175 A1* | 12/2009 | Wang ................ H04N 1/00233 358/1.13 |
| 2011/0016464 A1 | 1/2011 | Tamura et al. |
| 2011/0161652 A1 | 6/2011 | Ogura et al. |
| 2017/0187912 A1 | 6/2017 | Tamura |

FOREIGN PATENT DOCUMENTS

| JP | 2011-150531 | 8/2011 |
| JP | 2013-247425 | 12/2013 |
| JP | 2016-128219 | 7/2016 |
| JP | 2016-163987 | 9/2016 |

OTHER PUBLICATIONS

U.S. Appl. No. 15/456,725, filed Mar. 13, 2017, Shingo Tamura.

* cited by examiner

*Primary Examiner* — Helen Zong
(74) *Attorney, Agent, or Firm* — Oblon, McClelland, Maier & Neustadt, L.L.P.

(57) ABSTRACT

An information processing apparatus communicably connected with at least one device, including circuitry to: calculate a predetermined-amount reaching time at which a usage amount of a function of the at least one device reaches a predetermined usage amount; obtain a communication time taken for communication with the at least one device; obtain a suspension time taken for the at least one device to suspend the function; calculate a notification expiration time that is a time obtained by subtracting the communication time and the suspension time from the predetermined-amount reaching time; and request the at least one device to suspend the function when the notification expiration time is reached.

11 Claims, 8 Drawing Sheets

INFORMATION PROCESSING APPARATUS, INFORMATION PROCESSING SYSTEM, AND USAGE MANAGEMENT METHOD

CROSS-REFERENCE TO RELATED APPLICATIONS

This patent application is based on and claims priority pursuant to 35 U.S.C. § 119(a) to Japanese Patent Application No. 2016-182406, filed on Sep. 16, 2016, in the Japan Patent Office, the entire disclosure of which is hereby incorporated by reference herein.

BACKGROUND

Technical Field

The present invention relates to an information processing apparatus, and information processing system, and method of managing a usage amount of at least one device.

Description of the Related Art

The recent print management system manages the total number of pages printed by a plurality of printing devices connected to a network so as not to exceed an upper limit that has been preset for each device or user, for example. In this print management system, an authentication server that authenticates a user, a management server that manages the number of pages printed, and a plurality of printing devices are connected via a network, for example. The management server has a setting for an upper limit on the number of pages that can be printed by each printing device over a certain time period.

Before and during printing, the management server determines whether the total number of pages printed by the individual printing devices has reached an upper limit that has been set for each user, for example. Upon detecting the number of printed pages reaching the upper limit before or during printing, the management server controls each of the printing devices to suspend printing. The total number of pages printed by the printing devices connected to the network can therefore be controlled so as not to exceed the preset upper limit on the number of printable pages.

SUMMARY

An information processing apparatus communicably connected with at least one device, including circuitry to: calculate a predetermined-amount reaching time at which a usage amount of a function of the at least one device reaches a predetermined usage amount; obtain a communication time taken for communication with the at least one device; obtain a suspension time taken for the at least one device to suspend the function; calculate a notification expiration time that is a time obtained by subtracting the communication time and the suspension time from the predetermined-amount reaching time; and request the at least one device to suspend the function when the notification expiration time is reached.

BRIEF DESCRIPTION OF THE SEVERAL VIEWS OF THE DRAWINGS

A more complete, appreciation of the disclosure and many of the attendant advantages and features thereof can be readily obtained, and understood from, the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

System Configuration

Figure 1:
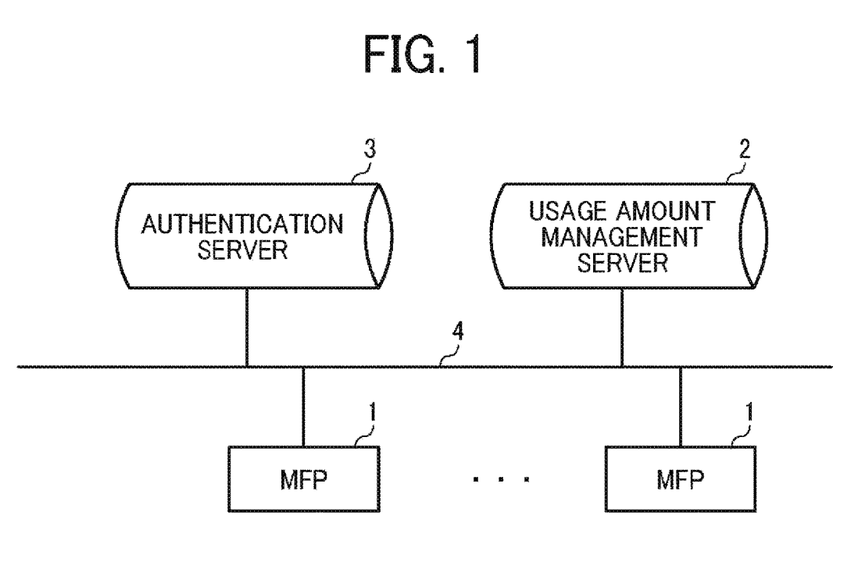
FIG. 1 is a system block diagram of a usage amount management system according to an embodiment.

FIG. 1 is a system block diagram of a usage amount management system according to an embodiment. As illustrated in FIG. 1, the usage amount management system includes one or a plurality of multifunction peripherals (MFPs) 1, a usage amount management server 2, and an authentication server 3. The MFPs 1, the usage amount management server 2, and the authentication server 3 are connected to one another via a predetermined network 4 such as a local area network (LAN). The usage amount management server 2 manages the amount of usage of a function such as a printing function, a scanner function, a copying function, or a facsimile function allowed for the MFPs 1 as a whole. Examples of the amount of usage to be managed include the number of pages printed, the number of pages scanned, the number of pages copied, or the number of pages transmitted or received by facsimile. The authentication server 3 performs a user authentication process to authenticate a user who is allowed to perform printing. Each of the MFPs 1 is an example of a device subjected for management. The printing function, the scanner function, the copying function, the facsimile function, or any other function of each of the MFPs 1 is an example of a function of the device.

In the following, the operation of a usage amount management system according to an embodiment will be described in conjunction with an example of managing the total number of pages printed by the MFPs 1. An operation for managing the number of pages scanned, the number of pages copied, or the like is similar to the following operation. Thus, an operation for managing any other "usage amount" such as the number of pages scanned or the number of pages copied will be understood by reference to the following description.

Hardware Configuration of MFP

Figure 2:
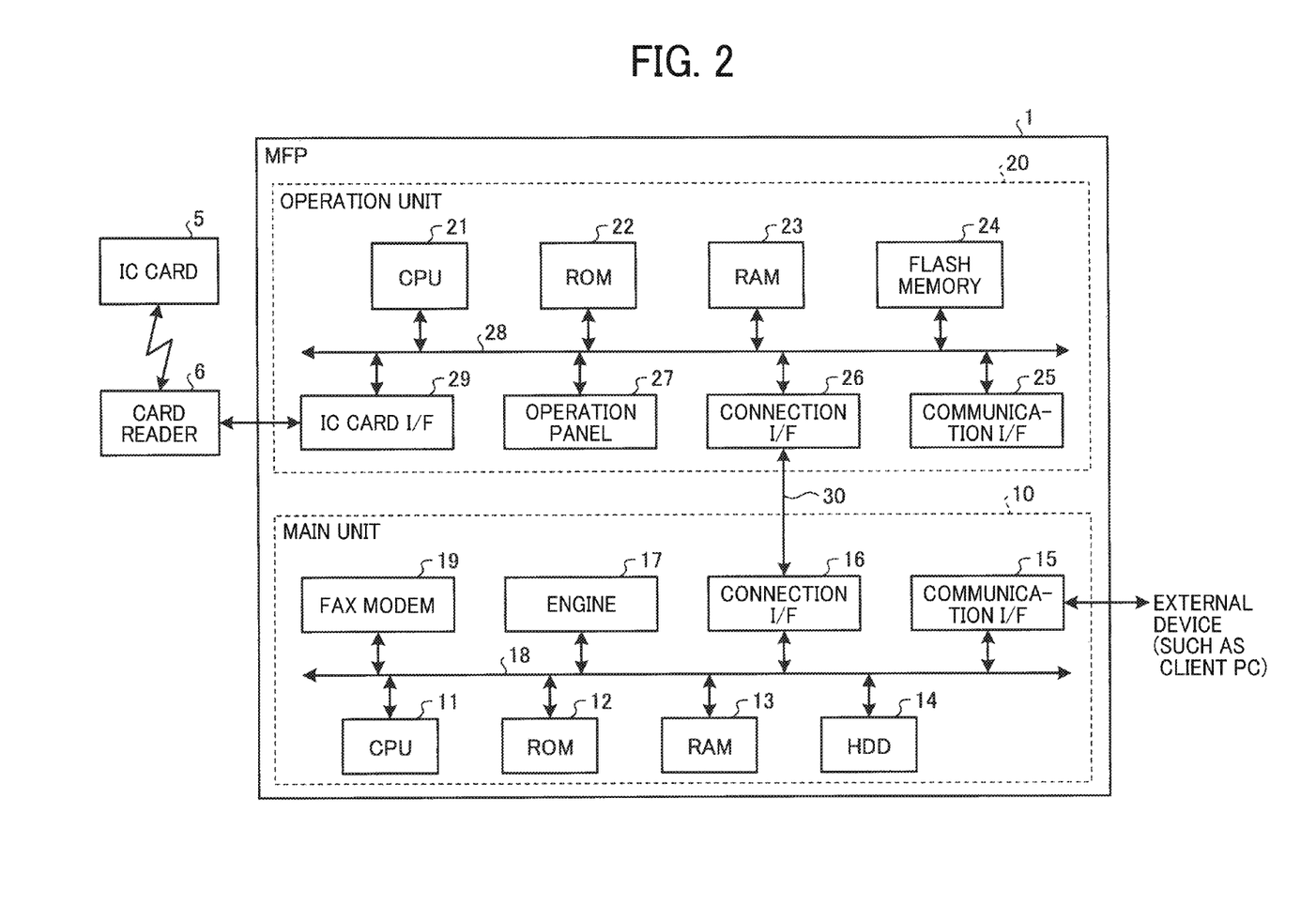
FIG. 2 is a hardware block diagram of a multifunction peripheral (MFP) according to the embodiment.

FIG. 2 is a hardware block diagram of each of the MFPs 1. As illustrated in FIG. 2, the MFP 1 includes a main unit 10 having various functions such as a copying function, a scanner function, a facsimile function, and a printer function, and an operation unit 20 that receives an input corresponding to a user operation.

The main unit 10 and the operation unit 20 are connected to each other via a dedicated communication channel 30 in such a manner as to be capable of communicating with each other. The communication channel 30 may be a Universal Serial Bus (USB) communication channel, for example, or may be a communication channel based on any other suitable standard regardless of wired or wireless. The main unit 10 may have at least one of functions for processing images, including, for example, a copying function, a scanner function, a facsimile function, and a printer function.

The operation unit 20 may be a standalone electronic device that is capable of executing information processing. In one example, the operation unit 20 may be an information processing terminal such as a smartphone or a tablet terminal. An information processing terminal used as the operation unit 20 functions as an operation unit of the MFP 1.

More specifically, an information processing terminal used as the operation unit 20 is removably coupled to the MFP 1, unlike a conventional operation panel fixedly attached to the MFP 1 as a dedicated operation unit. That is, an information processing terminal used as the operation unit 20, which is removable (or separable) from the MFP 1, is attached integrally to the MFP 1 at a predetermined position, for example, at a position at which an operation panel would be attached to the MFP 1. Therefore, the information processing terminal used as the operation unit 20 and the MFP 1 may be considered as a single device. The information processing terminal serving as the operation unit 20, which is removed from the MFP 1, communicates with the MFP 1 via wireless technology such as Bluetooth (registered trademark) technology or infrared technology and functions as an operation unit of the MFP 1.

The main unit 10 performs an operation corresponding to the input received by the operation unit 20. The main unit 10 is capable of communicating also with external devices, such as the usage amount management server 2 and the authentication server 3, and performs operations in accordance with instructions received from the external devices.

Hardware Configuration of Main Unit

The hardware configuration of the main unit 10 will now be described. As illustrated in FIG. 2, the main unit 10 includes a central processing unit (CPU) 11, a read-only memory (ROM) 12, a random access memory (RAM) 13, and a hard disk drive (HDD) 14. The main unit 10 further includes a communication interface (I/F) 15, a connection I/F 16, an engine 17, and a facsimile modem (fax modem) 19. The components 11 to 17 and the fax modem 19 are connected to one another via a system bus 18.

The CPU 11 centrally controls the operations of the main unit 10. The CPU 11 executes a program stored in the ROM 12, the HDD 14, or the like while using the RAM 13 as a work area, and controls the overall operation of the main unit 10 accordingly, thereby implementing various functions such as the copying function, the scanner function, the facsimile function, and the printer function described above. Further, the CPU 11 performs an operation of controlling the number of print document pages printed so as not to exceed a predetermined upper limit (an example of a predetermined usage amount) under control of the usage amount management server 2, as described below. The HDD 14 of the main unit 10 may be implemented using a flash memory.

The communication I/F 15 is an interface for communicating with external devices such as the usage amount management server 2 and the authentication server 3 that are connected to the network 4. The connection I/F 16 is an interface for communicating with the operation unit 20 via the communication channel 30. While the communication channel 30 is represented as a wired line in FIG. 2, as described above, the operation unit 20 is attachable to and removable from the main unit 10 of the MFP 1. Thus, the communication channel 30 functions as a wired communication channel when the operation unit 20 is attached to the MFP 1, and the communication channel 30 functions as a wireless communication channel when the operation unit 20 is separate from the MFP 1.

The engine 17 is a hardware component for performing processing dedicated to the MFP 1, for example, for implementing the copying function, the scanner function, the facsimile function, the printer function, and other functions. The engine 17 includes, for example, a scanner that scans and reads an image on a document, a plotter that performs printing on a sheet material such as paper, and a facsimile communicator that performs facsimile communication. The engine 17 may also include specific optional devices such as a finisher that collates printed sheet materials and an automatic document feeder (ADF) that automatically feeds document pages.

In one example, the MFP 1 performs user authentication using an integrated circuit (IC) card 5 as an authentication device. Alternatively, the authentication device may be any of various information terminals such as smartphones and mobile phones having functions available for user authentication (or having an application installed). Instead of an IC card or an identification (ID) card, any storage medium capable of storing user information may be used.

Hardware Configuration of Operation Unit

The hardware configuration of the operation unit 20 will now be described. As illustrated in FIG. 2, the operation unit 20 includes a CPU 21, a ROM 22, a RAM 23, a flash memory 24, a communication I/F 25, a connection I/F 26, an operation panel 27, and an IC card I/F 29. The components 21 to 27 and 29 are connected to one another via a system bus 28. The flash memory 24 of the operation unit 20 may be implemented using an HDD.

The CPU 21 centrally controls the operations of the operation unit 20. The CPU 21 executes a program stored in the ROM 22 or the like while using the RAM 23 as a work area and controls the overall operation of the operation unit 20 accordingly. The connection I/F 26 is an interface for communicating with the main unit 10 via the communication channel 30.

The IC card I/F 29 is connected to a card reader 6 via, for example, a USB cable. The card reader 6 performs contactless wireless communication with the IC card 5, which is brought into close proximity to the card reader 6 (contactless operation) by a user, when the user requests to log into the MFP 1, and reads authentication information stored in the IC card 5, such as a card ID or user information. The card reader 6 may read the authentication information from the IC card 5 through a contact operation rather than through a contactless operation.

In one example, the card reader 6 and the operation unit 20 are described as physically separate devices that are connected to each other via a USB cable or the like. However, the operation unit 20 may contain the card reader 6. That is, the operation unit 20 and the card reader 6 may be formed integrally (as a single device).

An IC card and an ID card, regardless of different names used, are non-restrictive examples. Any storage medium may be used. Also, any device capable of reading user information from such a storage medium may be used as a card reader device.

The operation panel 27 is formed by a liquid crystal display (LCD) including a touch sensor. The operation panel 27 receives various inputs corresponding to user operations, and displays various types of information such as information corresponding to received inputs, information indicating the operation state of the MFP 1, and information indicating the settings of the MFP 1. The operation panel 27 may be formed by an organic electroluminescent (EL) display including a touch sensor. Additionally or alternatively, the operation panel 27 may include an operation unit such as hardware keys or a display unit such as a light-emitting unit.

Software Configuration of MFP

Figure 3:
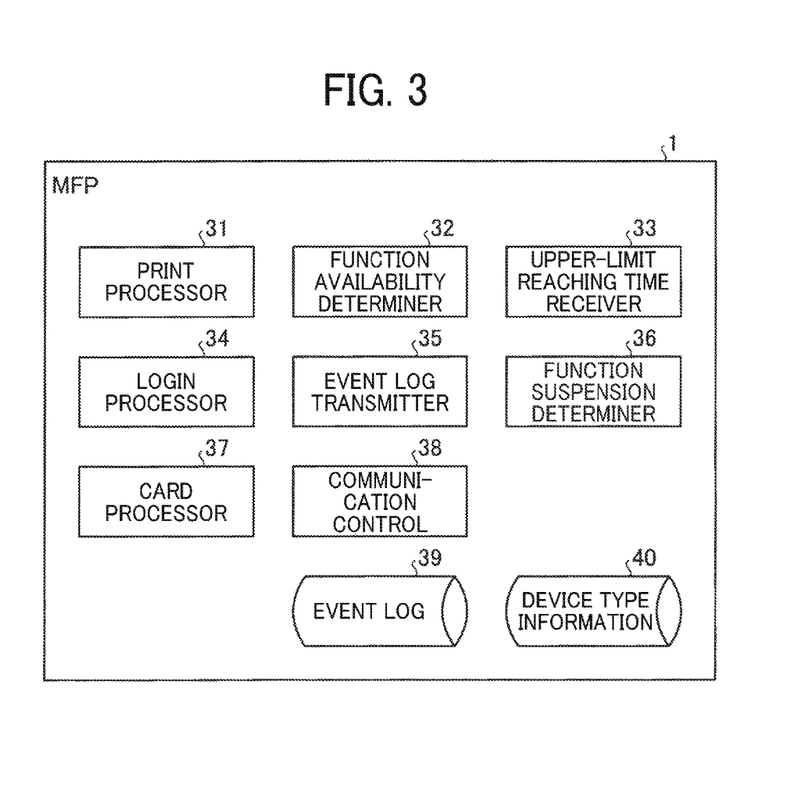
FIG. 3 is a diagram illustrating a software configuration of the MFP according to the embodiment.

FIG. 3 illustrates software components included in the MFP 1. As illustrated in FIG. 3, the MFP 1 includes a print processor 31, a function availability determiner 32, an upper-limit reaching time receiver 33, a login processor 34, an event log transmitter 35, a function suspension determiner 36, a card processor 37, and a communication control 38. The MFP 1 stores various types of information such as an event log 39 and device type information 40 in a memory. The print processor 31, the function availability determiner 32, the upper-limit reaching time receiver 33, the login processor 34, the event log transmitter 35, the function suspension determiner 36, the card processor 37, and the communication control 38 are functions implemented by the CPU 11 of the main unit 10 (or by the CPU 21 of the operation unit 20) executing a usage amount management program for the MFP 1.

The card processor 37 acquires user information from the IC card 5, which is placed close to the card reader 6 coupled to the MFP 1 by a user through a contactless operation, when the user logs into the MFP 1, and sends a login request to the login processor 34. The login processor 34 requests the authentication server 3 to perform a user authentication using, as key information, a user ID and a password input by the user through the IC card 5 or the operation panel 27. When the user is authenticated as an authorized user by the authentication server 3, the login processor 34 permits the user to log into the MFP 1.

When the user is to use a function of the MFP 1, the function availability determiner 32 inquires of the usage amount management server 2 and determines whether the function is available. When the function availability determiner 32 determines that the user is allowed to use the printing function, the print processor 31 performs control to start printing and stores print information in a memory as the event log 39. The function suspension determiner 36 determines whether to suspend the function. If the function suspension determiner 36 determines that the function is to be suspended, the print processor 31 controls the printing function of the engine 17 to suspend printing.

The event log transmitter 35 notifies the usage amount management server 2 of the start of printing by the user, the end of printing by the user, information about a print log, and so on. The upper-limit reaching time receiver 33 receives upper-limit reaching time information from the usage amount management server 2. The function suspension determiner 36 determines whether to deactivate the device on the basis of the current time, an estimated upper-limit reaching time, and device information (for example, printing suspension process time).

The usage amount management program, the event log 39, and the device type information 40 may be stored at any location in the MFP 1. That is, the usage amount management program, the event log 39, and the device type information 40 may be stored in a memory of the main unit 10, such as the ROM 12, the RAM 13, or the HDD 14, or may be stored in a memory of the operation unit 20, such as the ROM 22, the RAM 23, or the flash memory 24.

In the foregoing description, the print processor 31, the function availability determiner 32, the upper-limit reaching time receiver 33, the login processor 34, the event log transmitter 35, the function suspension determiner 36, the card processor 37, and the communication control 38 are implemented as software in accordance with the usage amount management program. However, some or all of the print processor 31, the function availability determiner 32, the upper-limit reaching time receiver 33, the login processor 34, the event log transmitter 35, the function suspension determiner 36, the card processor 37, and the communication control 38 may be implemented as hardware such as ICs.

The usage amount management program may be provided as a file in an installable or executable format in such a manner as to be recorded on a recording medium readable by a computer device, such as a compact disc read-only memory (CD-ROM) or a flexible disc (FD). Alternatively, the usage amount management program may be provided in such a manner as to be recorded on a recording medium readable by a computer device, such as a CD recordable (CD-R), a digital versatile disk (DVD), a Blu-ray disc (registered trademark), or a semiconductor memory. The usage amount management program may be provided in such a manner as to be installed via a network such as the Internet. Otherwise, the usage amount management program may be provided in such a manner as to be incorporated into a ROM or the like in a device in advance.

Figure 4:
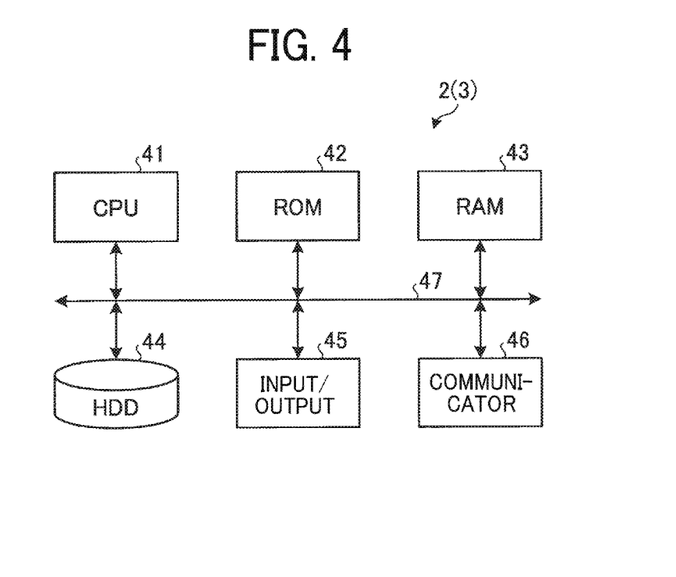
FIG. 4 is a hardware block diagram of a usage amount management server and an authentication server, according to the embodiment.

Hardware Configuration of Usage Amount Management Server and Authentication Server FIG. 4 is a hardware block diagram of the usage amount management server 2 and the authentication server 3. As illustrated in FIG. 4, the usage amount management server 2 and the authentication server 3 each include a CPU 41, a ROM 42, a RAM 43, an HDD 44, an input/output 45, and a communicator 46. For simplicity, the usage amount management server 2 and the authentication server 3 may be collectively referred to as the server to describe the hardware configuration.

The CPU 41 centrally controls the operations of the server. More specifically, the CPU 41 executes a program stored in the ROM 42 or the HDD 44 using the RAM 43 as a work area for the CPU 41, to perform various operations. The input/output 45 has a function of inputting and outputting, and may be implemented by a keyboard, a mouse, a display, and a touch panel having the input and output functions. The communicator 46 has a function of communicating with an external apparatus, and may be implemented by a network interface circuit.

Software Configuration of Usage Amount Management Server

Figure 5:
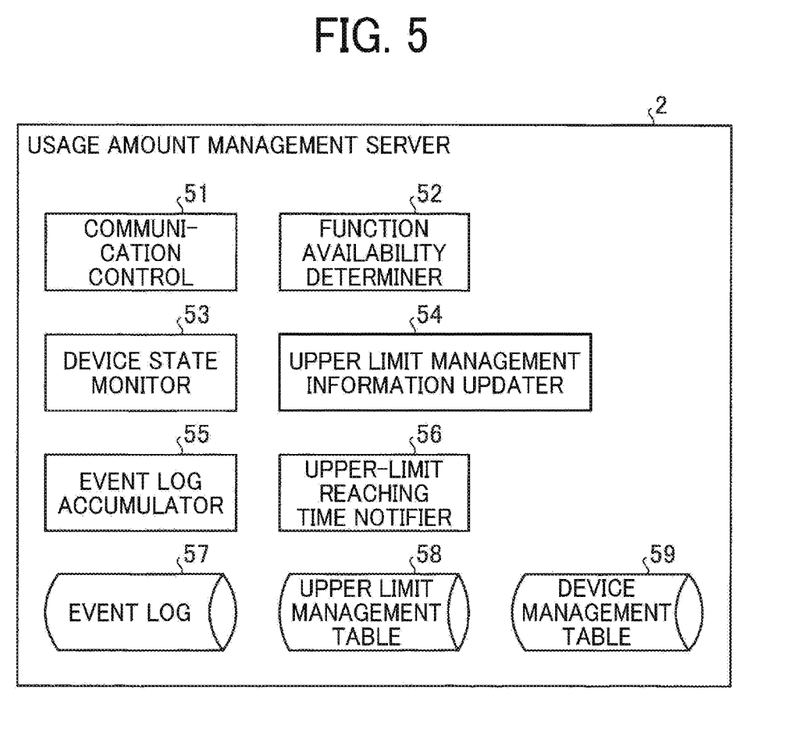
FIG. 5 is a diagram illustrating a software configuration of the usage amount management server according to the embodiment.

FIG. 5 illustrates a software configuration of the usage amount management server 2. As illustrated in FIG. 5, the usage amount management server 2 includes a communication control 51, a function availability determiner 52, a device state monitor 53, an upper limit management information updater 54, an event log accumulator 55, and an upper-limit reaching time notifier 56. The usage amount management server 2 stores an event log 57, an upper limit management table 58, and a device management table 59 in a memory. The communication control 51, the function availability determiner 52, the device state monitor 53, the upper limit management information updater 54, the event log accumulator 55, and the upper-limit reaching time notifier 56 are functions implemented by the CPU 41 of the usage amount management server 2 executing a usage amount management program for the usage amount management server 2.

In the foregoing description, the communication control 51, the function availability determiner 52, the device state monitor 53, the upper limit management information updater 54, the event log accumulator 55, and the upper-limit reaching time notifier 56 are implemented as software in accordance with the usage amount management program. Alternatively, some or all of the communication control 51, the function availability determiner 52, the device state monitor 53, the upper limit management information updater 54, the event log accumulator 55, and the upper-limit reaching time notifier 56 may be implemented as hardware such as ICs.

The usage amount management program may be provided as a file in an installable or executable format in such a manner as to be recorded on a recording medium readable by a computer device, such as a CD-ROM or an FD. Alternatively, the usage amount management program may be provided in such a manner as to be recorded on a recording medium readable by a computer device, such as a CD-R, a DVD, a Blu-ray disc (registered trademark), or a semiconductor memory. The usage amount management program may be provided in such a manner as to be installed via a network such as the Internet. Otherwise, the usage amount management program may be provided in such a manner as to be incorporated into a ROM or the like in a device in advance.

Upon receipt of an inquiry about availability of the function from the MFP 1, the function availability determiner 52 determines whether the function is available, by using information indicating the current usage amount stored in the upper limit management table 58. The device state monitor 53 receives a response indicating permission to use the function and events indicating the start and end of printing from the MFP 1, and updates information stored in the device management table 59, namely, device state information indicating the state of the device and communication time information indicating the communication time taken for communication from the usage amount management server 2 to the MFP 1.

The event log accumulator 55 receives a notification of use of a function of, the MFP 1 and stores the event log 57 in a memory. Table 1 gives an example of the event log 57.

TABLE 1

| Occurrence time | Event type | Event details |
|---|---|---|
| Jul. 27, 2016 12:03 | Start of copying | {"User":"A", "Kind":"Copy", "CopyId":"123456"} |
| Jul. 27, 2016 12:04 | Notification of printing of copy | {"User":"A", "Kind":"Copy", "CopyId":"123456", "Function":"Print", "Size":"A4", "PageCount":1} |
| Jul. 27, 2016 12:04 | Notification of printing of copy | {"User":"A", "Kind":"Copy", "CopyId":"123456", "Function":"Print", "Size":"A4", "PageCount":1} |
| Jul. 27, 2016 12:04 | End of copying | {"User":"A", "Kind":"Copy", "CopyId":"123456"} |

In one example, pieces of information indicating an occurrence time, an event type, and event details are stored in association with one another as the event log 57 in the memory. The information indicating the occurrence time includes information indicating the time of occurrence of each event, for example, "7/27/2016 12:03 (12:03 p.m. on July 27, 2016)". The information indicating the event type includes information indicating the type of each event, for example, "start of copying" or "notification of printing of copy". The information indicating the event details includes the name of a user who has performed an operation that triggers each event, for example, "user A", the name of a function corresponding to the event, for example, "copy", a copy identification number (copy ID), for example, "123456", the size of paper used for copying, for example, "A4", and the initial value to start counting the number of pages copied, for example, "1".

The upper limit management information updater 54 performs calculation using the event'log 57 and updates information stored in the upper limit management table 58, namely, total usage amount information indicating the total usage amount of the function and estimated upper-limit reaching time information indicating the estimated upper-limit reaching time. Table 2 gives an example of the upper limit management table 58.

TABLE 2

| User | Total amount of use (expressed in pages) | Upper limit amount of use (expressed in pages) | Estimated upper-limit reaching time |
|---|---|---|---|
| A | 1538 | 2000 | Jul. 30, 2016 18:03:21 |
| B | 829 | 2000 | — |
| ... | ... | ... | ... |

In the upper limit management table 58, in one example, pieces of information indicating a user name, for example, "user A" or "user B", a total usage amount, for example, "1538 pages" or "829 pages", an upper limit usage amount, for example, "2000 pages", and an estimated upper-limit reaching time, for example, "Jul. 30, 2016 18:03:21 (18:03:21 p.m. on Jul. 30, 2016)", are stored in association with one another.

Information on each of the MFPs 1 is transmitted from each of the MFPs 1 to the usage amount management server 2 and is stored in the usage amount management server 2. The usage amount management server 2 calculates the total usage amount (the number of pages) for each user, which is given in Table 2, on the basis of the event log 57 given in Table 1, determines whether the associated upper limit usage amount is reached, and calculates an estimated upper-limit reaching time.

The upper-limit reaching time notifier 56 notifies the MFP 1 of the upper-limit reaching time before the estimated upper-limit reaching time, by using the "estimated upper-limit reaching time information" stored in the upper limit management table 58 and the "communication time information indicating the communication time taken for communication from the usage amount management server 2 to the MFP 1" stored in the device management table 59. Table 3 gives an example of the device management table 59.

TABLE 3

| Device | Pages per minute (PPM) | Pages per sec (PPS) | Printing suspension process time (sec) | Communication time (sec) from server to device | Device state |
|---|---|---|---|---|---|
| 1 | 60 | 1 | 2 | 2 | Printing in progress ("User":"A") |
| 2 | 30 | 0.5 | 4 | 2 | Printing in progress ("User":"A") |
| 3 | 45 | 0.75 | 3 | 2 | Printing suspended |

In the device management table 59, in one example, pieces of information indicating the device number of each of the MFPs 1, for example, "1" or "2", the number of pages printable per minute (expressed in pages per minute (PPM)), for example, "60 pages" or "30 pages", the number of pages printable per second (expressed in pages per second (PPS)), for example, "1 page" or "0.5 pages", the time taken for a process to suspend printing, for example, "2 seconds" or "4 seconds", the time taken for communication from the usage amount management server 2 to the MFP 1, for example, "2 seconds", and the current state of the MFP 1, for example, "printing in progress (user A)" or "printing suspended", are stored in association with one another.

Software Configuration of Authentication Server

Figure 6:
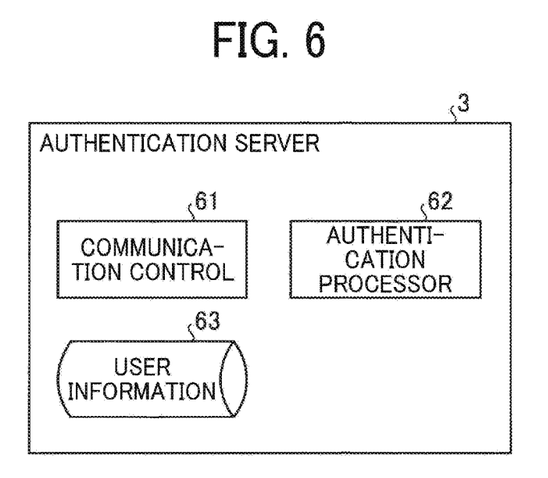
FIG. 6 is a diagram illustrating a software configuration of the authentication server according to the embodiment.

FIG. 6 illustrates a software configuration of the authentication server 3. As illustrated in FIG. 6, the authentication server 3 includes a communication control 61 and an authentication processor 62. A memory of the authentication server 3 stores user information 63. The communication control 61 and the authentication processor 62 are functions implemented by the CPU 41 of the authentication server 3 executing an authentication processing program. Upon receipt of an authentication process request from the MFP 1, the authentication processor 62 refers to the user information 63 stored in the memory of the authentication server 3 and performs a user authentication process that is a determination process for determining whether the user is an authorized user.

Operation of Calculating Upper-Limit Reaching Time and Notification Expiration

As is understood from Table 3, the usage amount management server 2 manages performance information and a device state of each of the MFPs 1 connected to the network 4. For example, when a given MFP 1 enters a printing-in-progress state, the upper-limit reaching time notifier 56 of the usage amount management server 2 calculates an estimated reaching time at which the printing usage amount of the user will reach the upper limit usage amount by using the number of pages printable per second, which indicates the performance of the MFP 1. If the estimated reaching time at which the upper limit usage amount will be reached is changed, the upper-limit reaching time notifier 56 notifies the MFP 1 of the estimated reaching time. In addition, the upper-limit reaching time notifier 56 notifies the MFP 1 of the estimated reaching time immediately before the estimated reaching time. Furthermore, the upper-limit reaching time notifier 56 notifies the MFP 1 of the estimated reaching time at the time calculated by performing an inverse operation using the printing suspension process time taken for the MFP 1 to perform a printing suspension process and using the communication time taken for communication.

Specifically, the upper-limit reaching time notifier 56 calculates the formula below at intervals of a predetermined time and monitors the printing usage amount of the user to determine whether the printing usage amount of the user has reached the upper limit usage amount.

$$P_\tau + \sum_{x=1}^{n} \{(t_L - t) \times PPS_x\} < P_{MAX}$$

In this formula, "$P_\tau$" denotes the total number of printed pages obtained at the current time, "$P_{MAX}$" denotes the upper limit on the number of printable pages, "t" denotes the current time, "$t_L$" denotes the estimated value of time at which the upper limit on the number of printable pages will be reached, and "$PPS_x$" denotes the number of pages printable by an $MFP_x$ per second.

The upper-limit reaching time notifier 56 further calculates the formula below at intervals of a predetermined time to calculate an expiration time by which the usage amount management server 2 notifies the $MFP_x$ of the upper-limit reaching time.

$$t_{Lx} = t_L - T_{Sx} - T_{Dx}$$

In this formula, "$T_{Sx}$" denotes the time taken for the $MFP_x$ to perform a printing suspension process, "$T_{Dx}$" denotes the delay time taken until the usage amount management server 2 notifies the $MFP_x$ of an event (the time taken for communication between the usage amount management server 2 and the $MFP_x$), and "$t_{Lx}$" denotes the notification expiration time that is an expiration time by which the usage amount management server 2 notifies the $MFP_x$ of the upper-limit reaching time.

Figure 7:
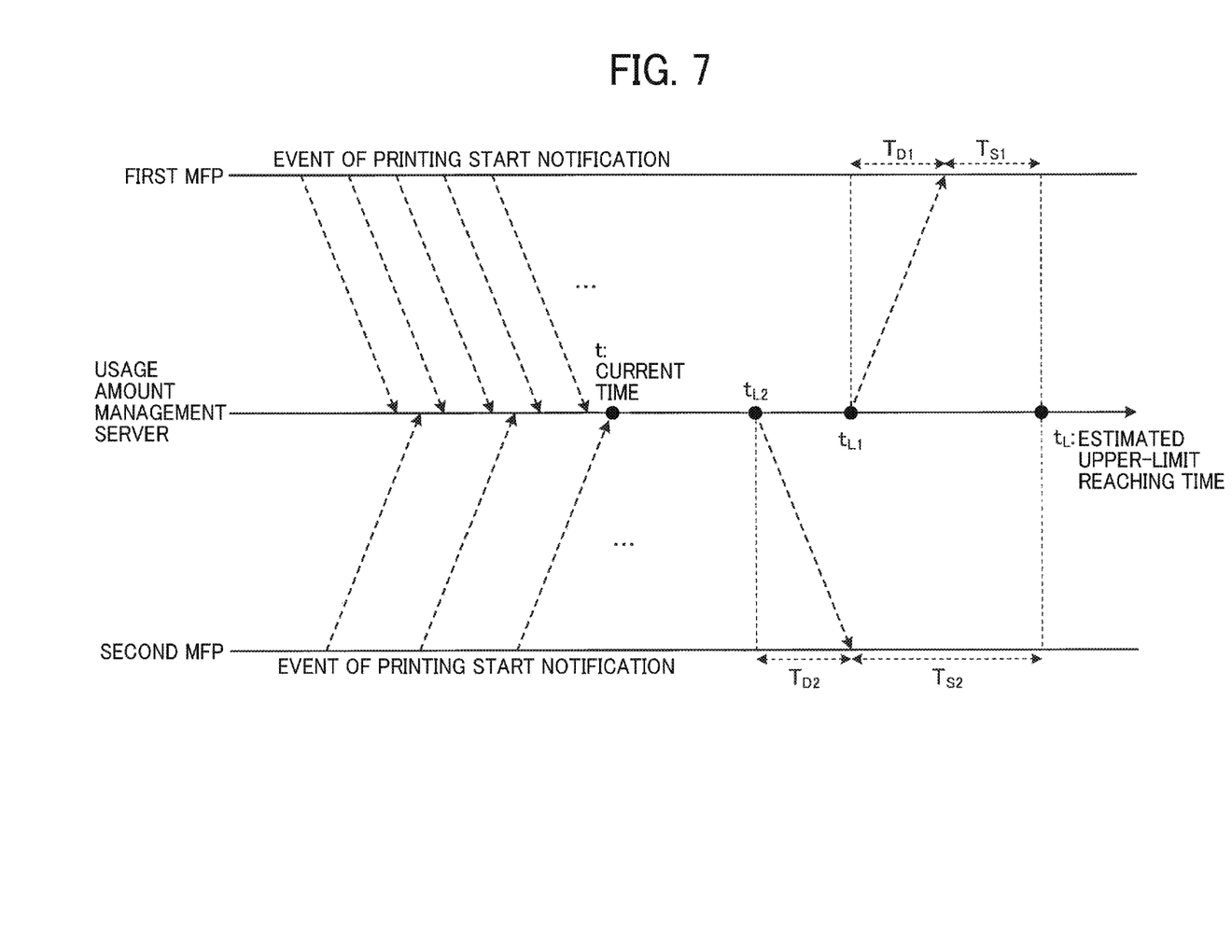
FIG. 7 is an illustration for explaining operation of calculating an estimated value of time at which the number of pages printed by a user who is performing printing with a plurality of MFPs will reach the upper limit, according to the embodiment.

FIG. 7 illustrates an operation of calculating an estimated value of time at which the number of pages printed by a user who is currently performing printing using a plurality of MFPs 1 (i.e., a first MFP and a second MFP) will reach the upper limit. In FIG. 7, after starting printing, each of the first MFP and the second MFP sequentially transmits event information to the usage amount management server 2. The event information includes the current time t and the number of pages printed. For instance, the first MFP, which is currently printing, can print 1 PPS and the second MFP, which is currently printing, can print 0.5 PPS. In this case, according to calculation, for example, the two MFPs print "(40×1)+(40×0.5)=60 pages" 40 seconds later. The upper-limit reaching time notifier 56 calculates the estimated time $t_L$, which is a time when the number of pages printed is estimated to reach the upper limit, on the basis of the performance of the first and second MFPs and the total number of printed pages obtained at the current time t.

The upper-limit reaching time notifier 56 subtracts a time $T_{S1}$ taken for the first MFP to perform a printing suspension process and a delay time $T_{D1}$ taken until the usage amount management server 2 provides an event notification to the first MFP from an estimated time $t_L$ at which the upper limit will be reached, and determines the obtained time as a notification expiration time $t_{L1}$ by which the first MFP is notified of the upper-limit reaching time. Likewise, the upper-limit reaching time notifier 56 subtracts a time $T_{S2}$ taken for the second MFP to perform a printing suspension process and a delay time $T_{D2}$ taken until the usage amount management server 2 provides an event notification to the second MFP from an estimated time $t_L$ at which the upper limit will be reached, and determines the obtained time as a notification expiration time $t_{L2}$ by which the second MFP is notified of the upper-limit reaching time.

The upper-limit reaching time notifier 56 notifies the first MFP and the second MFP of the notification expiration times $t_{L1}$ and $t_{L2}$ calculated in the way described above, respectively, in advance. Accordingly, each of the MFPs 1 can start a printing suspension process prior to the time $t_L$ at which the upper limit on the usage amount is estimated to be reached. Thus, the total usage amount of the MFPs 1 can be controlled so as not to exceed the preset upper limit on the usage amount.

Operation of Inquiring Whether Printing is Permitted

Figure 8:
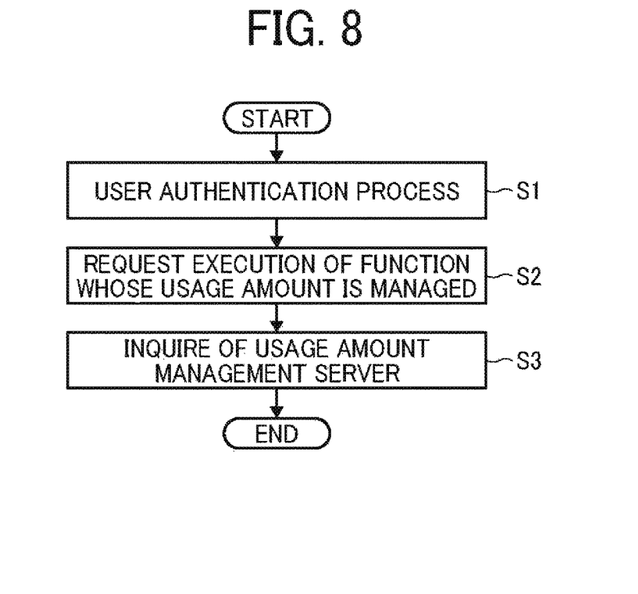
FIG. 8 is a flowchart illustrating processing, from a user authentication process until the usage amount management server is inquired of about availability of a function, performed by the MFP in the usage amount management system according to the embodiment.

FIG. 8 is a flowchart illustrating the flow of processing performed by the MFP 1 in the usage amount management system according to the embodiment from a user authentication process until the usage amount management server 2 is inquired of about availability of a function. When a user brings the IC card 5, which stores user information such as the user name and the user identification number, close to the card reader 6, the card reader 6 reads the user information from the IC card 5 and supplies the read user information to the IC card I/F 29. The card processor 37 of the MFP 1 illustrated in FIG. 3 acquires the user information via the IC card I/F 29 and transfers the user information to the login processor 34. The login processor 34 controls the communication I/F 25 to transmit the transferred user information to the authentication server 3, and inquires whether the user is an authorized user.

The communication control 61 of the authentication server 3 transfers the user information received from the MFP 1 to the authentication processor 62. The authentication processor 62 determines whether the user information 63 stored in the memory includes user information that matches the transferred user information, thereby performing a user authentication process. The communication control 61 transmits a determination result obtained as a result of the user authentication process to the MFP 1. When the determination result obtained from the authentication server 3 indicates that the user is an authorized user, the login processor 34 of the MFP 1 allows the user to log into the system in the MFP 1 (step S1).

The user allowed to log in then executes a printing process via the operation panel 27. The function availability determiner 32 of the MFP 1 acquires a request for executing a printing process from the operation panel 27 (step S2). Upon acquiring a request for executing a printing process, the function availability determiner 32 inquires of the usage amount management server 2 about availability of the printing function (step S3). The function availability determiner 52 of the usage amount management server 2 determines whether printing is permitted in accordance with a sequence diagram illustrated in FIG. 9 or 10.

Availability Determination Operation when Printing is Permitted

Figure 9:
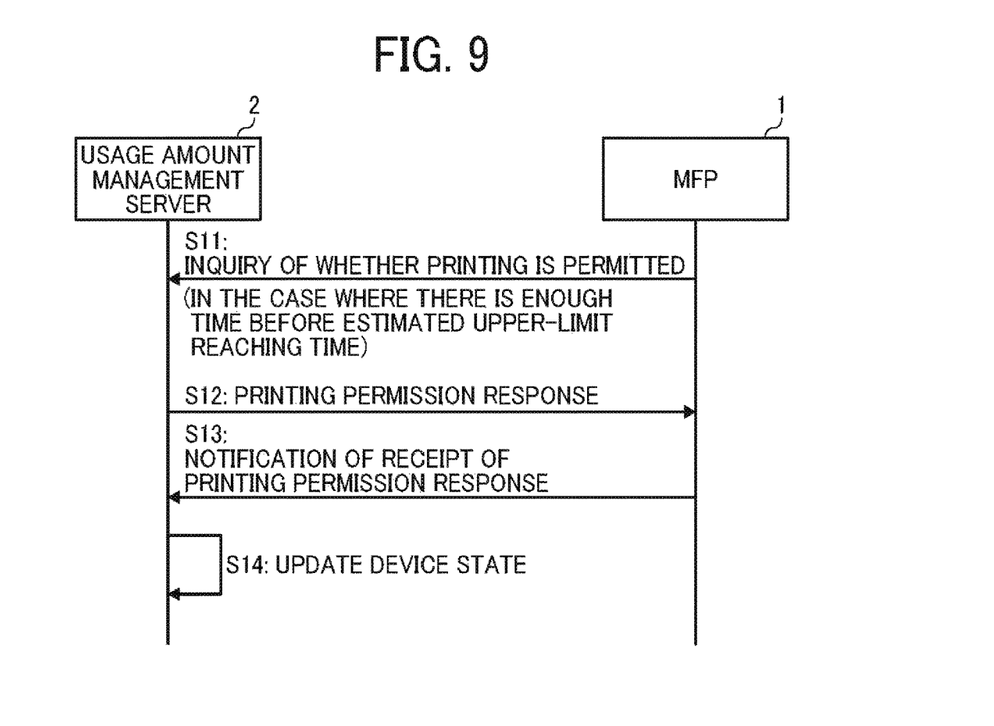
FIG. 9 is a sequence diagram illustrating operation performed by the usage amount management server and the MFP, when printing is permitted, according to the embodiment.

FIG. 9 is a sequence diagram illustrating the flow of operations performed by the usage amount management server 2 and the MFP 1 when it is determined that printing is possible. When the MFP 1 inquires whether printing is permitted (step S11), the function availability determiner 52 of the usage amount management server 2 refers to the upper limit management table 58 on the basis of the user information and determines whether there is enough time before an estimated time at which the number of pages printed by the user will reach the upper limit. If it is determined that there is enough time before the estimated time at which the number of pages printed by the user will reach the upper limit, the function availability determiner 52 creates a printing permission response including transmission time information indicating the time of transmission and transmits the printing permission response to the MFP 1 (step S12).

The function availability determiner 32 of the MFP 1 calculates the difference between the transmission time information of the usage amount management server 2, which is included in the received printing permission response, and receipt time information indicating the time of receipt of the printing permission response to calculate the delay time of communication between the MFP 1 and the usage amount management server 2. The communication control 38 of the MFP 1 creates a notification of receipt of the printing permission response in such a manner that the notification includes delay time information indicating the calculated delay time, and transmits the notification of receipt of the printing permission response to the usage amount management server 2 (step S13). The print processor 31 of the MFP 1 controls printing of a print document designated by the user upon receipt of the printing permission response.

The upper limit management information updater 54 of the usage amount management server 2 updates the communication time (see Table 3) stored in the device management table 59 illustrated in Table 3 to the delay time information stored in the notification of receipt of the printing permission response and also updates the device state to the "printing in progress" state (step S14).

Availability Determination Operation when Printing is Rejected

Figure 10:
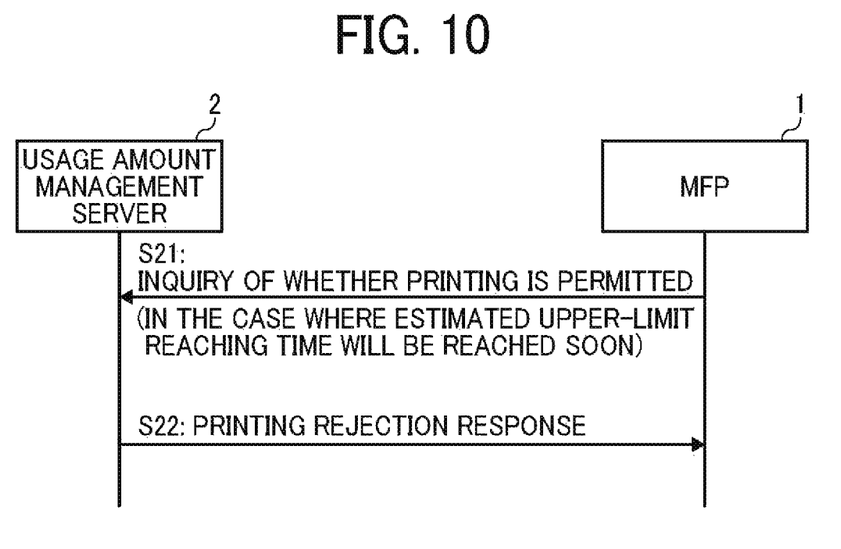
FIG. 10 is a sequence diagram illustrating operation performed by the usage amount management server and the MFP, when printing is rejected, according to the embodiment.

FIG. 10 is a sequence diagram illustrating the flow of operations performed by the usage amount management server 2 and the MFP 1 when printing is rejected. When the MFP 1 inquires whether printing is permitted (step S21), the function availability determiner 52 of the usage amount management server 2 refers to the upper limit management table 58 on the basis of the user information and determines whether there is enough time before the time at which the number of pages printed by the user is estimated to reach the upper limit.

If it is determined that there is not enough time before the time at which the number of pages printed by the user is estimated to reach the upper limit, the function availability determiner 52 creates a printing rejection response indicating rejection of printing and transmits the printing rejection response to the MFP 1 (step S22). When the printing rejection response is received, the function availability determiner 32 of the MFP 1 determines that the function is not available. Accordingly, the printing request from the user is rejected and the print document is not printed.

Function Suspension Process for Plurality of MFPs

Figure 11:
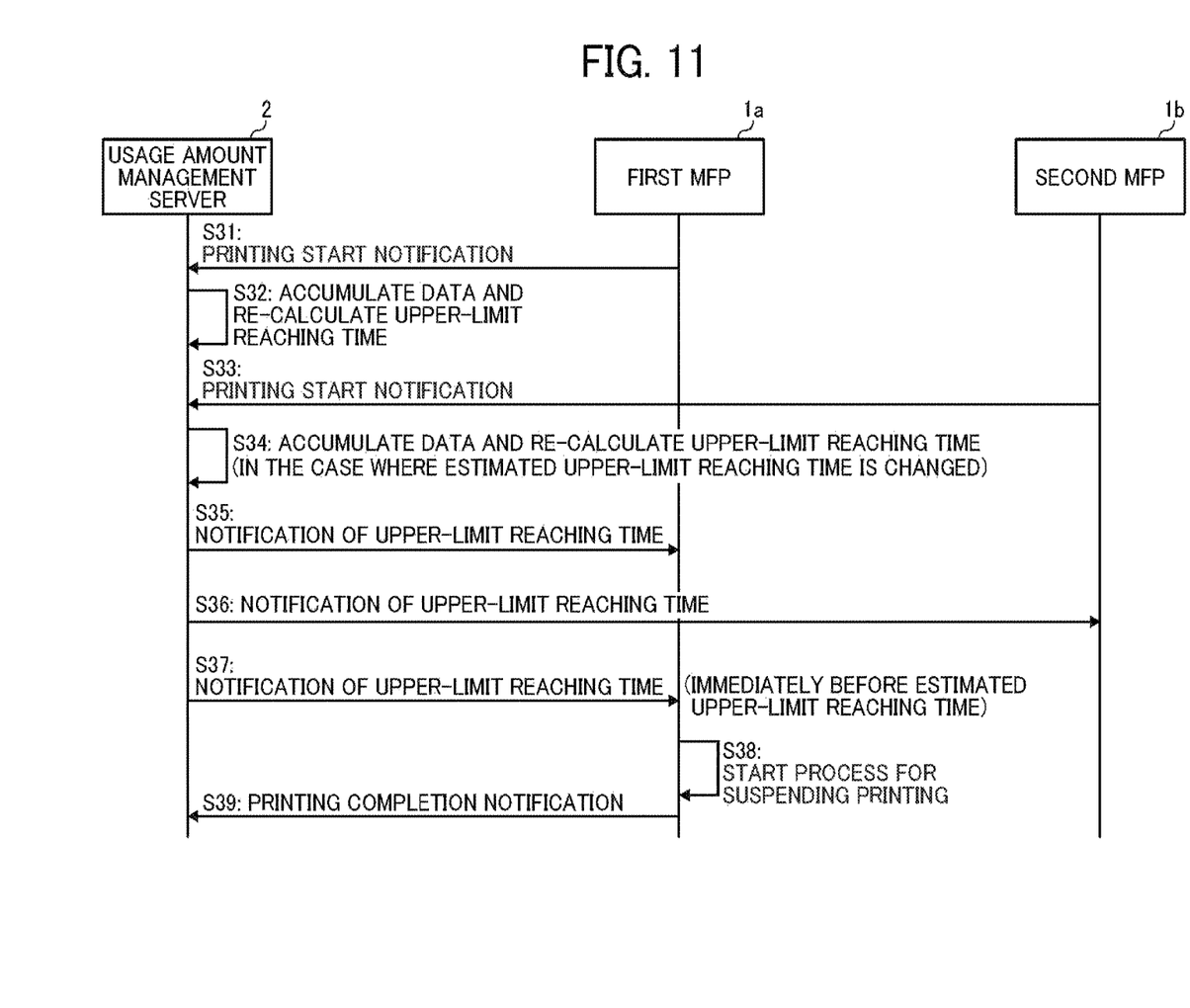
FIG. 11 is a sequence diagram illustrating a function suspension process for a plurality of MFPs, performed by the usage amount management server and the MFPs, according to an embodiment.

FIG. 11 is a sequence diagram illustrating the flow of a function suspension process for a plurality of MFPs, performed by the usage amount management system, according to an embodiment. The example illustrated in FIG. 11 represents the flow of operations for controlling the total number of printed pages so as not to exceed the upper limit on the number of printable pages on the basis of event information on a first MFP 1a and a second MFP 1b. The usage amount management server 2 may control the number of printed pages on the basis of event information on more than two MFPs.

After starting printing, as in steps S31 and S33, the event log transmitters 35 of the first MFP 1a and the second MFP 1b provide a printing start notification to the usage amount management server 2. Each of the event log transmitters 35 of the first MFP 1a and the second MFP 1b provides an event notification to the usage amount management server 2 in the way illustrated in FIG. 7 each time printing of one page is completed, for example.

The event log accumulator 55 of the usage amount management server 2 stores the event logs 57 received from the MFPs 1a and 1b in the memory. The upper limit management information updater 54 of the usage amount management server 2 re-calculates notification expiration times ($t_{L1}$ and $t_{L2}$) illustrated in FIG. 7, which are expiration times by which a notification indicating that the total number of pages printed by the MFPs 1a and 1b becomes equal to the upper limit on the number of printable pages, by using the event logs 57 stored in the memory (steps S32 and S34).

If there is a difference (variation) between the re-calculated notification expiration times and the previous calculated notification expiration times, the upper-limit reaching time notifier 56 notifies the MFPs 1a and 1b of the re-calculated respective notification expiration times (the respective most recently determined notification expiration times) (steps S35 and S36). The upper-limit reaching time receivers 33 of the MFPs 1a and 1b receive the notifications of the respective notification expiration times from the usage amount management server 2. Further, the function suspension determiners 36 of the MFPs 1a and 1b each monitor the time of suspension of the printing on the basis of the notification expiration time received from the usage amount management server 2.

As described above with reference to FIG. 7, when the notification expiration times ($t_{L1}$ and $t_{L2}$) for the MFPs 1a and 1b are reached, the usage amount management server 2 sequentially notifies the MFPs 1a and 1b of the estimated time of reaching the upper limit (step S37). Thus, as illustrated in FIG. 7, the MFPs 1a and 1b can be notified of the estimated time of reaching the upper limit at the times $t_{L1}$ and $t_{L2}$, which are earlier than the estimated time $t_L$ at which the total number of pages printed by the MFPs 1a and 1b will reach the upper limit, respectively.

In each of the MFPs 1a and 1b, the upper-limit reaching time receiver 33 receives the notification of the estimated time of reaching the upper limit and transfers the notification of the estimated time of reaching the upper limit to the function suspension determiner 36. Upon receipt of the notification of the estimated time of reaching the upper limit from the usage amount management server 2, the function suspension determiner 36 transmits the determination result indicating suspension of printing to the print processor 31. Upon receipt of the determination result indicating suspension of printing, the print processor 31 performs a printing suspension process (step S38). In each of the MFPs 1a and 1b, when the print processor 31 completes the printing suspension process, the communication control 38 transmits a printing completion notification to the usage amount management server 2 (step S39).

Upon being notified of the re-calculated notification expiration times (the most recently determined notification expiration times) by the usage amount management server 2 in steps S35 and S36, the respective function suspension determiners 36 each check the current time and determine whether the notified notification expiration time is reached. If the notified notification expiration time is reached, the function suspension determiner 36 transmits a determination result indicating suspension of printing to the print processor 31. Upon receipt of the determination result indicating suspension of printing, the print processor 31 performs a printing suspension process (step S38). In each of the MFPs 1a and 1b, when the print processor 31 completes the printing suspension process, the communication control 38 transmits a printing completion notification to the usage amount management server 2 (step S39).

That is, upon receipt of a notification expiration time from the usage amount management server 2, each of the MFPs 1a and 1b performs a printing suspension process. Each of the MFPs 1a and 1b also performs a printing suspension process when the corresponding one of the re-calculated notification expiration times (the most recently determined notification expiration times) obtained from the usage amount management server 2 in steps S35 and S36 is reached.

In other words, each of the MFPs 1a and 1b performs a printing suspension process upon receipt of a notification expiration time from the usage amount management server 2, and also performs a printing suspension process when each of the MFPs 1a and 1b determines that the notification expiration time is reached. Thus, each of the MFPs 1a and 1b can start a printing suspension process at the monitored notification expiration time even if the usage amount management server 2 delays notifying the MFPs 1a and 1b of the respective notification expiration times.

As will be appreciated from the foregoing description, in a usage amount management system according to an embodiment, the usage amount management server 2 calculates a notification expiration time ($t_{L1}$ and $t_{L2}$), which is an expiration time by which the usage amount management server 2 notifies each MFP 1 of an upper limit on the usage amount, by subtracting the "time ($T_{S1}$ and $T_{S2}$ illustrated in FIG. 7) taken for a process to suspend the function" and the "time ($T_{D1}$ and $T_{D2}$ illustrated in FIG. 7) taken for communication between the MFP 1 and the usage amount management server 2" from the time ($t_L$ illustrated in FIG. 7) at which the usage amount of the function of the MFP 1 is estimated to reach a predetermined upper limit. When the notification expiration time is reached, the usage amount management server 2 notifies the MFP 1 of the upper limit on the usage amount.

Accordingly, the process for suspending the function can be started from a time (notification expiration time) that is earlier than the time $t_L$ at which the usage amount is estimated to actually reach the upper limit and that is obtained by taking into account the time taken for the process to suspend the function and the communication time. Thus, it is possible to prevent a situation in which even if the usage amount management server 2 determines that the function is to be suspended, the MFP 1 continuously operates due to the presence of communication delay or the like between the MFP 1 and the usage amount management server 2, it takes time until the function is suspended, and the function is used in excess of the usage amount set as the upper limit. That is, the usage amount of the function of the MFP 1 can be controlled so as not to exceed a predetermined upper limit on the usage amount for each user or device, for example.

The overlapping of, for example, printing processes of a plurality of MFPs 1 increases network traffic, which results in delay of matching between the number of pages printed by the MFPs 1 and the number of printable pages set in the usage amount management server 2. With this delay, even if the usage amount management server 2 determines suspension of printing, printing is continuously performed for a period until printing is actually suspended, and as a result printing may be performed after the number of printable pages that has been set as the upper limit is exceeded. In particular, when the same user performs printing using a plurality of printing devices simultaneously, due to the presence of communication delay between a management server and each of the printing devices, the number of pages printed by the user may exceed the upper limit on the number of printable pages described above. Even in this case, in an embodiment, the usage amount management system can start a printing suspension process before the time at which the total number of pages printed is estimated to reach the upper limit is actually reached. Thus, the number of pages printed by individual MFPs 1 or the like can be controlled so as not to exceed the predetermined upper limit on the total number of printable pages for each user or device, for example.

In an embodiment, furthermore, the usage amount management server 2 in the usage amount management system monitors a notification expiration time and each MFP 1 also monitors a notification expiration time. Thus, each MFP 1 can start a process for suspending a function even if the usage amount management server 2 delays notifying the MFP 1 of an upper limit on the usage amount. Thus, the usage amount of the function of the MFP 1 can further be controlled so as not to exceed a predetermined upper limit on the usage amount for each user or device, for example.

The embodiments described above are presented for illustrative purposes and are not intended to limit the scope of the present invention to the embodiments described above. Each of the exemplary embodiments described above may be practiced in combination with one or more of various other embodiments, and a variety of omissions, replacements, and modifications may be made without departing from the scope of the invention. Each of the embodiments and modifications thereof fall within the spirit or scope of the invention, and also fall within the scope of the invention as defined by the appended claims and equivalents thereof.

In the foregoing description, for example, embodiments of the present invention are applied to an MFP 1 configured such that the operation unit 20 is attachable to or removable from the main unit 10. A device such as an MFP configured such that an operation unit is fixed to a main unit can also achieve the same or similar advantages as or to those described above.

Each of the MFPs 1 in the embodiments described above is an example of a device according to at least one embodiment of the present invention. An embodiment of the present invention may be applied to any device having various functions, such as a projector device, a videoconference system, or a digital camera device, each of which may be managed by the usage amount management server 2.

The functions described in the embodiments described above can be each implemented by one or a plurality of processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The illustrated server apparatuses are only illustrative of one of several computing environments for implementing the embodiments disclosed herein. For example, in some embodiments, the usage amount management server 2 includes a plurality of computing devices, e.g., a server cluster, that are configured to communicate with each other over any type of communications link, including a network, a shared memory, etc. to collectively perform the processes disclosed herein. Similarly, the authentication server 3 can include a plurality of computing devices that are configured to communicate with each other.

Moreover, the usage amount server apparatus and the device subjected for management can be configured to share the processing steps disclosed, e.g., in FIGS. 7 to 11, in various combinations. For example, the processes performed by the usage management server 2 can be performed by the MFP 1.

The invention claimed is:

1. An information processing apparatus communicably connected with at least one device, comprising circuitry to:
    calculate a predetermined-amount reaching time at which a usage amount of a function of the at least one device reaches a predetermined usage amount;
    obtain a communication time taken for communication with the at least one device;
    obtain a suspension time taken for the at least one device to suspend the function;
    calculate a notification expiration time that is a time obtained by subtracting the communication time and the suspension time from the predetermined-amount reaching time; and
    request the at least one device to suspend the function when the notification expiration time is reached.

2. The information processing apparatus of claim 1, wherein the circuitry further notifies the at least one device of the notification expiration time.

3. The information processing apparatus of claim 1, wherein, when the at least one device comprises a plurality of devices, the notification expiration time includes a plurality of notification expiration times respectively calculated for a plurality of devices, and when the notification expiration time for each of the plurality of devices is reached, the circuitry requests the corresponding one of the plurality of devices to suspend the function.

4. An information processing system comprising:
    at least one device capable of performing a function; and
    the information processing apparatus of claim 1.

5. An information processing system comprising:
    at least one device capable of performing a function, including first circuitry; and
    an information processing apparatus communicably connected with the at least one device, including second circuitry, the first circuitry and the second circuitry being configured to cooperate with each other to:

calculate a predetermined-amount reaching time at which a usage amount of a function of the at least one device reaches a predetermined usage amount;

obtain a communication time taken for communication with the at least one device;

obtain a suspension time taken for the at least one device to suspend the function;

calculate a notification expiration time that is a time obtained by subtracting the communication time and the suspension time from the predetermined-amount reaching time; and request the at least one device to suspend the function when the notification expiration time is reached.

6. The information processing system of claim 5, wherein the at least one device includes an image forming apparatus capable of printing, and the usage amount of a function is a usage amount of a printing function that at least indicates a number of printed pages.

7. The information processing system of claim 5, wherein, when the at least one device comprises a plurality of devices, the notification expiration time includes a plurality of notification expiration times respectively calculated for a plurality of devices, and when the notification expiration time for each of the plurality of devices is reached, the second circuitry of the information processing apparatus sends a notification that requests to suspend the function, to the corresponding one of the plurality of devices.

8. The information processing system of claim 7, wherein the second circuitry of the information processing apparatus further sends a notification indicating the notification expiration time to the at least one device, and wherein the first circuitry of the at least one device starts processing to suspend the function at an, earlier time of: a time when the at least one device receives the request to suspend the function from the information processing apparatus; and a time when the at least one device receives the notification indicating the notification expiration time from the information processing apparatus.

9. A method for managing a usage amount of at least one device, comprising:

calculating a predetermined-amount reaching time at which a usage amount of a function of the at least one device reaches a predetermined usage amount;

obtaining a communication time taken for communication with the at least one device;

obtaining a suspension time taken for the at least one device to suspend the function;

calculating a notification expiration time that is a time obtained by subtracting the communication time and the suspension time from the predetermined-amount reaching time; and requesting the at least one device to suspend the function when the notification expiration time is reached.

10. The method of claim 9, further comprising:

notifying the at least one device of the notification expiration time.

11. The method of claim 10, wherein, when the at least one device comprises a plurality of devices, the notification expiration time includes a plurality of notification expiration times respectively calculated for a plurality of devices, and the requesting includes:

requesting the corresponding one of the plurality of devices to suspend the function, when the notification expiration time for each of the plurality of devices is reached.

* * * * *